United States Patent
Jang et al.

(10) Patent No.: US 9,432,738 B2
(45) Date of Patent: *Aug. 30, 2016

(54) METHOD OF PROVIDING USER SPECIFIC INTERACTION USING DEVICE AND DIGITAL TELEVISION (DTV), THE DTV, AND THE USER DEVICE

(71) Applicant: SAMSUNG ELECTRONICS CO., LTD., Suwon-si (KR)

(72) Inventors: Gyeong Ja Jang, Seoul (KR); Byung In Yoo, Seoul (KR); Yong Beom Lee, Seoul (KR); Young Chul Cho, Yongin-si (KR); Hyo Sun Hwang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/797,726

(22) Filed: Jul. 13, 2015

(65) Prior Publication Data

US 2015/0326930 A1    Nov. 12, 2015

Related U.S. Application Data

(63) Continuation of application No. 14/016,573, filed on Sep. 3, 2013, now Pat. No. 9,084,014.

(30) Foreign Application Priority Data

Feb. 20, 2013    (KR) .................... 10-2013-0017974

(51) Int. Cl.
*H04N 21/4728* (2011.01)
*H04N 21/442* (2011.01)
*H04N 21/858* (2011.01)
(Continued)

(52) U.S. Cl.
CPC ...... *H04N 21/4728* (2013.01); *H04N 21/4126* (2013.01); *H04N 21/4223* (2013.01); *H04N 21/44008* (2013.01); *H04N 21/44218* (2013.01); *H04N 21/4622* (2013.01); *H04N 21/4722* (2013.01); *H04N 21/8133* (2013.01); *H04N 21/858* (2013.01)

(58) Field of Classification Search
USPC .......... 725/12, 13, 14, 10, 9, 34, 51, 53, 80, 725/112, 131; 709/205; 434/142, 178, 157; 348/508, 563, 639, 646, 651, 660, 720, 348/723, 725
See application file for complete search history.

(56) References Cited

U.S. PATENT DOCUMENTS

2003/0074671 A1* 4/2003 Murakami .......... G06F 17/3089
725/109
2003/0097301 A1* 5/2003 Kageyama ........ G06F 17/30265
705/14.52

(Continued)

FOREIGN PATENT DOCUMENTS

JP    2009-159639    7/2009
KR    10-2011-0053111 A    5/2011

(Continued)

*Primary Examiner* — Jefferey Harold
(74) *Attorney, Agent, or Firm* — NSIP Law

(57) ABSTRACT

An interactive method includes displaying image content received through a television (TV) network, identifying an object of interest of a user among a plurality of regions or a plurality of objects included in the image content, and providing additional information corresponding to the object of interest.

21 Claims, 14 Drawing Sheets

(51) Int. Cl.

| | |
|---|---|
| *H04N 21/81* | (2011.01) |
| *H04N 21/41* | (2011.01) |
| *H04N 21/4223* | (2011.01) |
| *H04N 21/44* | (2011.01) |
| *H04N 21/462* | (2011.01) |
| *H04N 21/4722* | (2011.01) |

(56) References Cited

U.S. PATENT DOCUMENTS

| | | | |
|---|---|---|---|
| 2003/0097408 A1* | 5/2003 | Kageyama | H04L 12/1818 709/205 |
| 2006/0026302 A1* | 2/2006 | Bennett | H04L 29/06027 709/246 |
| 2008/0320543 A1* | 12/2008 | Wang | H04N 7/162 725/131 |
| 2009/0031390 A1 | 1/2009 | Rajakarunanayake et al. | |
| 2009/0100493 A1* | 4/2009 | Jones | H04N 21/235 725/131 |
| 2010/0107184 A1* | 4/2010 | Shintani | H04N 21/4436 725/10 |
| 2011/0078721 A1* | 3/2011 | Wang | H04N 7/162 725/25 |
| 2011/0082735 A1* | 4/2011 | Kannan | G06F 17/30247 705/14.23 |
| 2011/0214141 A1* | 9/2011 | Oyaizu | H04N 7/173 725/12 |
| 2012/0092475 A1 | 4/2012 | Li | |
| 2013/0061268 A1* | 3/2013 | Rothschild | H04N 21/234318 725/51 |
| 2013/0290993 A1* | 10/2013 | Cheung | H04N 21/4143 725/10 |
| 2013/0323694 A1* | 12/2013 | Baldwin | G09B 17/00 434/178 |

FOREIGN PATENT DOCUMENTS

| | | |
|---|---|---|
| KR | 10-2011-0073161 A | 6/2011 |
| KR | 10-1097358 B1 | 12/2011 |
| KR | 10-2012-0060978 A | 6/2012 |
| KR | 10-2012-0064557 A | 6/2012 |

* cited by examiner

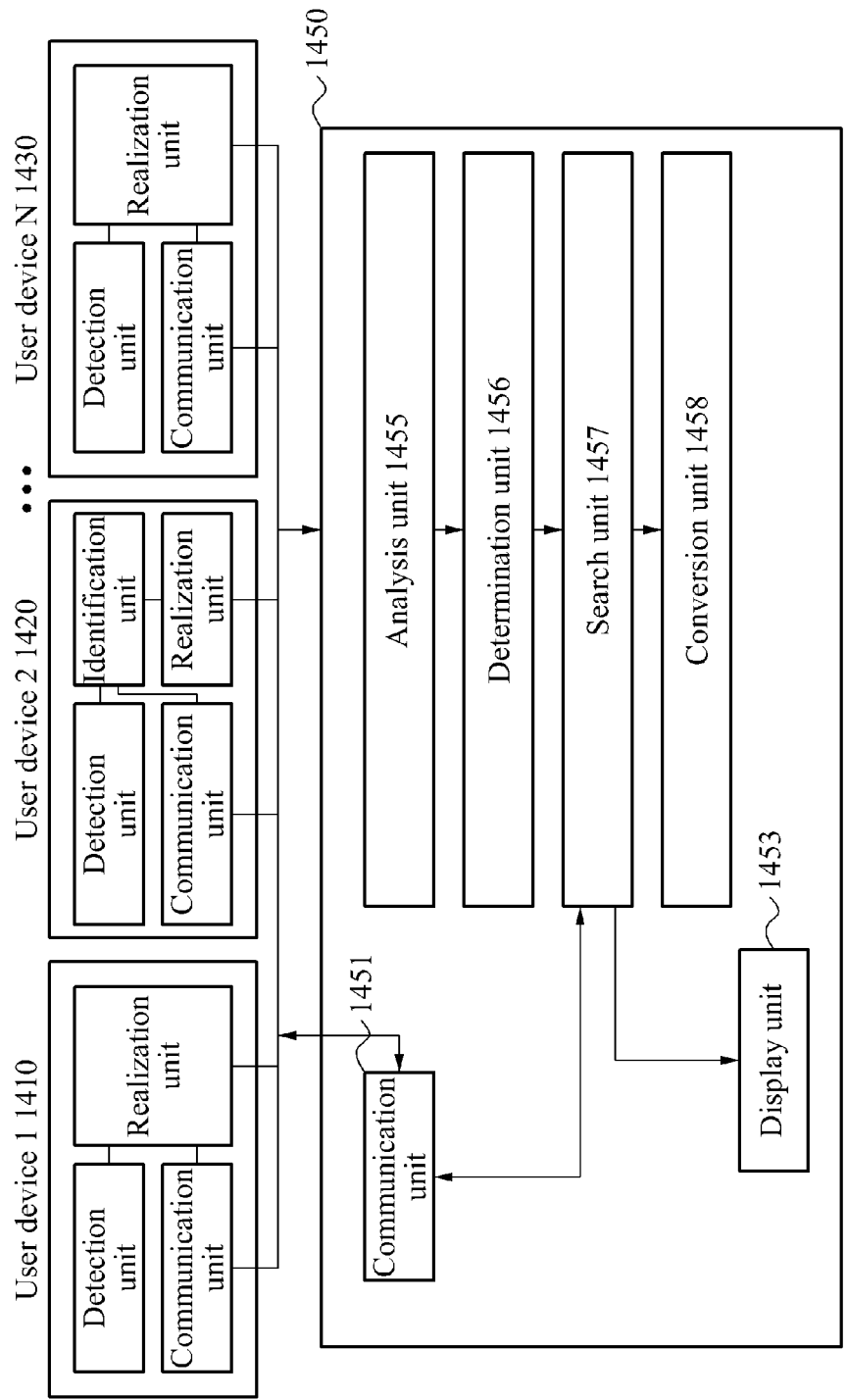

METHOD OF PROVIDING USER SPECIFIC INTERACTION USING DEVICE AND DIGITAL TELEVISION (DTV), THE DTV, AND THE USER DEVICE

CROSS-REFERENCE TO RELATED APPLICATIONS

This present application is a continuation of U.S. patent application Ser. No. 14/016,573 filed Sep. 3, 2013, which claims the priority benefit of Korean Patent Application No. 10-2013-0017974, filed on Feb. 20, 2013, in the Korean Intellectual Property Office, the disclosure of which is incorporated herein by reference.

BACKGROUND

1. Field

The following description relates to a method of providing user specific interaction using a digital television (DTV), the DTV, and a user device.

2. Description of the Related Art

A digital television (DTV) removes noise such as interference by other radio waves, by converting analog signals into digital signals and controlling the digital signals by a computer circuit, thereby providing increased image quality. In addition, the DTV is capable of selecting various information and programs as well as performing high level automatic control. Also, the DTV may reproduce a variety of high end images such as a picture in picture (PIP).

SUMMARY

The foregoing and/or other aspects are achieved by providing a method of providing user specific interaction, the method including receiving image content through a television (TV) network, displaying the image content, identifying an object of interest of a user among a plurality of regions or a plurality of objects included in the image content, and providing additional information corresponding to the object of interest.

The identifying may include tracking sight of the user using a photographing device, and identifying an object tracked by the sight of the user, among a plurality of regions or a plurality of objects included in the image content, as the object of interest of the user.

The method may further include receiving signals from a user device for the user, wherein the identifying may include identifying the object of interest using the signals received from the user device.

The identifying of the object of interest using the signals may include analyzing the signals received from the user device, determining a scene in which the signals are changed in the image content as a result of the analysis, and identifying a region or object included in the scene in which the signals are changed as the object of interest.

The signals received from the user device may include at least one of a vital signal of the user detected by the user device and an external force applied to the user device.

The method may further include searching for additional information corresponding to the object of interest.

The additional information corresponding to the object of interest may include at least one of information providing sensory stimulus corresponding to the object of interest, multinational language subtitles related to the image content that includes the object of interest, translation of a finger language, a Braille type, oscillation, audio supply, audio conversion, user specific sound, and information for enlargement of subtitle font.

The information providing sensory stimulus may include at least one of haptic information stimulating a haptic sense, sound information stimulating an auditory sense corresponding to the object of interest, display information stimulating a visual sense corresponding to the object of interest, smell information stimulating an olfactory sense corresponding to the object of interest, and taste information stimulating a taste sense corresponding to the object of interest.

The foregoing and/or other aspects are also achieved by providing a method of providing user specific interaction, the method including receiving image content through a TV network, displaying the image content, receiving an input of selection with respect to an object of interest of a user among a plurality of regions and a plurality of objects included in the image content, allowing interaction of the user with respect to the object of interest, and providing additional information corresponding to the object of interest in response to the interaction of the user.

The interaction may include at least one of a vital signal of the user detected by a user device and an external force applied to the user device.

The method may further include analyzing the interaction of the user with respect to the object of interest.

The method may include searching for additional information corresponding to emotion or request of the user recognized from the interaction of the user based on a result of the analyzing.

The providing of the additional information may include providing the additional information being found as the additional information corresponding to the object of interest.

The additional information corresponding to the object of interest may include at least one of information providing sensory stimulus corresponding to the object of interest, multinational language subtitles related to the image content that includes the object of interest, translation of a finger language, a Braille type, oscillation, audio supply, audio conversion, user specific sound, and information for enlargement of subtitle font.

The foregoing and/or other aspects are also achieved by providing a method of providing user specific interaction, the method including detecting an event generated in a user device in response to image content displayed on a DTV, identifying an object of interest of a user among a plurality of regions or a plurality of objects included in the image content based on the event, and transmitting information on the object of interest so as to be provided with additional information corresponding to the object of interest.

The identifying may include identifying a region or object included in the image content of a time point when the event is detected, among the plurality of regions or objects, as the object of interest.

The event generated in the user device may include at least one of a change in a vital signal of the user detected by the user device and a change in an external force applied to the user device.

The method may further include receiving additional information corresponding to the object of interest from the DTV, and realizing the additional information corresponding to the object of interest.

The method may further include transmitting signals including the event generated in the user device to the DTV.

The foregoing and/or other aspects are also achieved by providing a digital television (DTV) including a communication unit to receive image content through a TV network, a display unit to display the image content, and a control unit to identify an object of interest of a user among a plurality of regions or a plurality of objects included in the image content and provide additional information corresponding to the object of interest.

The control unit may include an analysis unit to analyze signals received from a user device, and a determination unit to determine a scene in which the signals are changed among a plurality of regions or a plurality of objects included in the image content as a result of the analyzing, wherein the DTV may identify a region or object included in the scene in which the signals are changed as the object of interest.

The control unit may further include a search unit to search for additional information corresponding to the object of interest.

The foregoing and/or other aspects are also achieved by providing a DTV including a communication unit to receive image content through a TV network, a display unit to display the image content, and a control unit to receive an input of selection with respect to an object of interest of a user among a plurality of regions or a plurality of objects included in the image content and provide additional information corresponding to the object of interest in response to interaction of the user.

The foregoing and/or other aspects are also achieved by providing a user device providing user specific interaction, the user device including a detection unit to detect an event generated in the user device in response to image content displayed on a DTV, an identifying unit to identify an object of interest of a user among a plurality of regions or a plurality of objects included in the image content based on the event, and a communication unit to transmit information on the object of interest or signals including the event generated in the user device so as to be provided with additional information corresponding to the object of interest.

The user device may further include a realization unit to realize the additional information corresponding to the object of interest, wherein the additional information is received from the DTV displaying the image content.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which:

FIG. 14 illustrates a system including a DTV and a plurality of user devices which provide user specific interaction, according to example embodiments.

DETAILED DESCRIPTION

Figure 1:
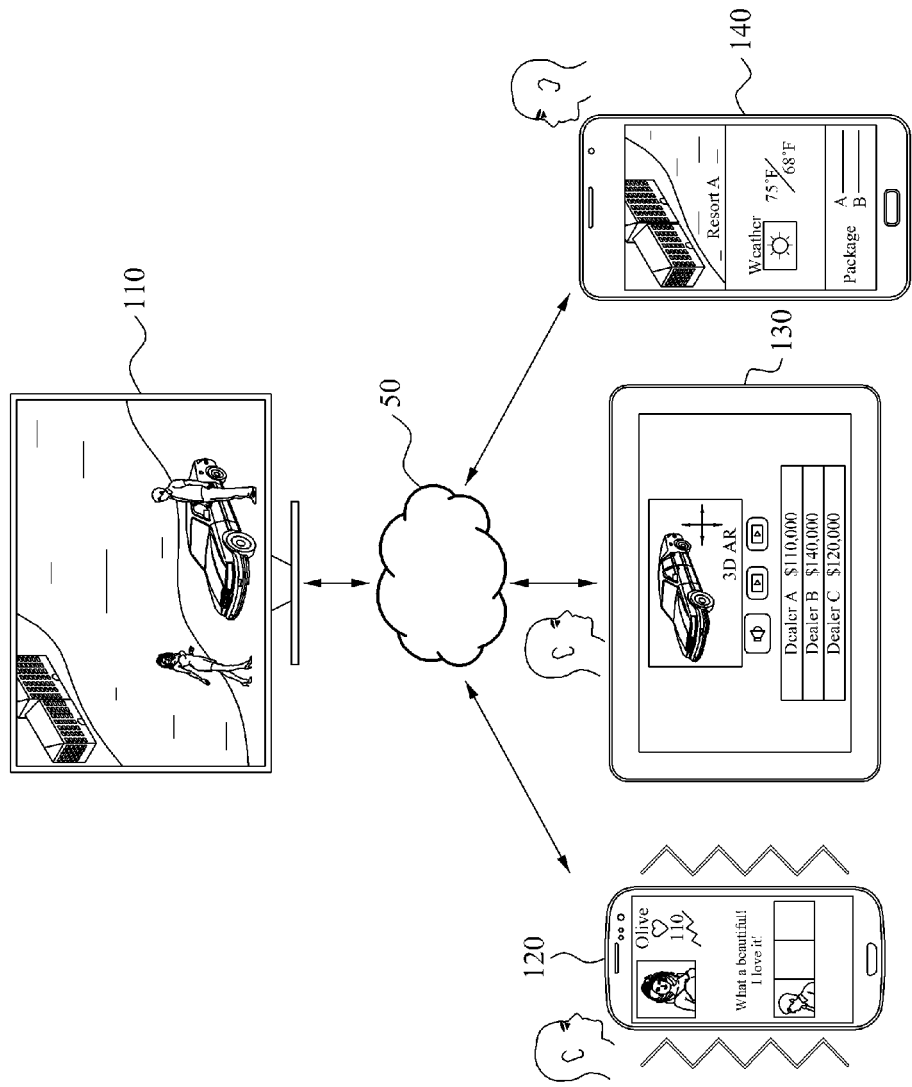
FIG. 1 illustrates a configuration of a system performing a method of providing user specific interaction according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 illustrates a configuration of a system performing a method of providing user specific interaction according to example embodiments.

Referring to FIG. 1, in the system in which a digital television (DTV) 110 and a plurality of user devices, such as user devices 120, 130, and 140, for example, are combined, when a plurality of users appreciate the same content provided through the DTV 110, different user specific interactions may be provided to the user devices 120, 130, and 140.

Here, the DTV 110 and the user devices 120, 130, and 140 may be connected to one another through a wired or wireless network 50.

The DTV 110 may analyze signals of the user devices 120, 130, and 140, and provide additional information corresponding to the analyzed signals to the user devices 120, 130, and 140. Here, when the additional information corresponding to the analyzed signals require conversion, the DTV 110 may convert the additional information to be appropriate for the user devices 120, 130, and 140 or for the user, and provide the additional information.

The user devices 120, 130, and 140 may receive an input of an object of interest of the user or preference information related to image content from the user, or receive and provide to the DTV 110 information according to a force applied to the user devices 120, 130, and 140 or a vital signal of the user.

In addition, the user devices 120, 130, and 140 may realize or reproduce the additional information corresponding to the object of interest provided from the DTV 110.

Thus, according to the example embodiments, when a plurality of users appreciate the image content, such as drama, movie, or commercials, for example, provided by the DTV 110, the user devices may sense and analyze the vital signal of the users or the force applied to the user devices 120, 130, and 140 using the user devices 120, 130, and 140, respectively. Also, the user devices 120, 130, and 140 may exchange interactions with the DTV 110 using a result of the sensing and analyzing. Here, the interactions exchanged between the user devices 120, 130, and 140 and the DTV 110 may be user specific interaction related to the image content displayed by the DTV 110.

Therefore, the DTV 110 may provide various information and direct or indirect experiences related to an object with which the user is interested when watching the image content such as commercials, movies, and dramas, for example.

Furthermore, when the users select the preference information of their own using the user devices 120, 130, and 140, the DTV 110 may provide additional information corresponding to the preference information of the users among the image content being reproduced, to the user devices 120, 130, and 140.

Thus, according to the example embodiments, interaction with respect to the content watched by the plurality of users may be enabled through the user devices 120, 130, and 140. Therefore, immersion and amusement with respect to the content may be increased, as a user specific service or feedback stimulating senses according to users are received. Moreover, even disabled people may enjoy the same content together with other people without a particular device dedicated for the disabled people.

Figure 2:
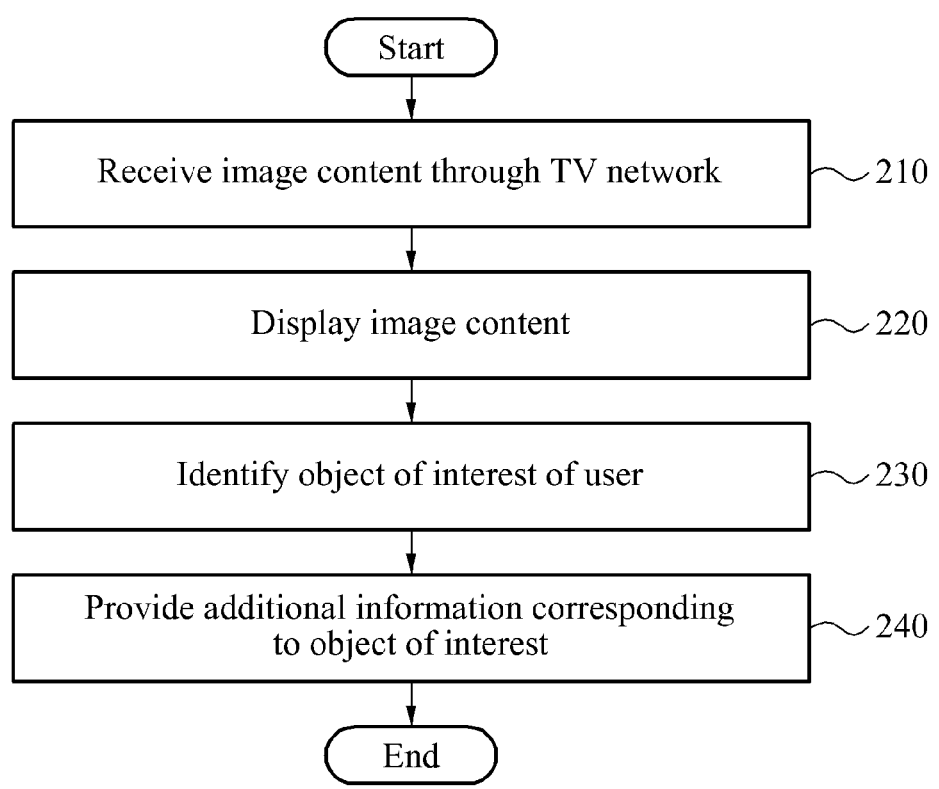
FIG. 2 illustrates a method of providing user specific interaction by a digital television (DTV) according to example embodiments.

FIG. 2 illustrates a flowchart of a method of providing user specific interaction by a DTV, according to example embodiments.

Referring to FIG. 2, the DTV according to the example embodiments identifies or estimates an object of interest of a user and provides additional information corresponding to the object of interest.

The DTV may receive image content through a TV network in operation 210 and display the image content in operation 220. The 'TV network' may be understood to include a broadcasting network, and the Internet, for example.

The DTV may identify the object of interest among a plurality of regions or a plurality of objects included in the image content, in operation 230. The 'object of interest' may refer to an object in which the user is interested, or an object with respect to which the user wants to be provided with various additional information, that is, the user specific interaction, besides the image content through the DTV.

The method of identifying the object of interest by the DTV in operation 230 will be described in detail with reference to FIGS. 3 and 4.

In operation 240, the DTV may provide the additional information corresponding to the object of interest identified in operation 230. Depending on embodiments, the DTV may search for the additional information corresponding to the object of interest and provide the additional information to user devices.

Here, the user devices may include a smart phone, a mobile personal computer (PC), a wearable user device such as glasses, and a flexible display, for example.

The additional information corresponding to the object of interest may include the information providing sensory stimulus corresponding to the object of interest, multinational language subtitles related to the image content that includes the object of interest, translation of a finger language, a Braille type, oscillation, audio supply, audio conversion, user specific sound, information for enlargement of subtitle font, and the like.

The information providing sensory stimulus corresponding to the object of interest may include at least one of haptic information stimulating a haptic sense, sound information stimulating an auditory sense corresponding to the object of interest, display information stimulating a visual sense corresponding to the object of interest, smell information stimulating an olfactory sense corresponding to the object of interest, and taste information stimulating a taste sense corresponding to the object of interest.

Figure 3:
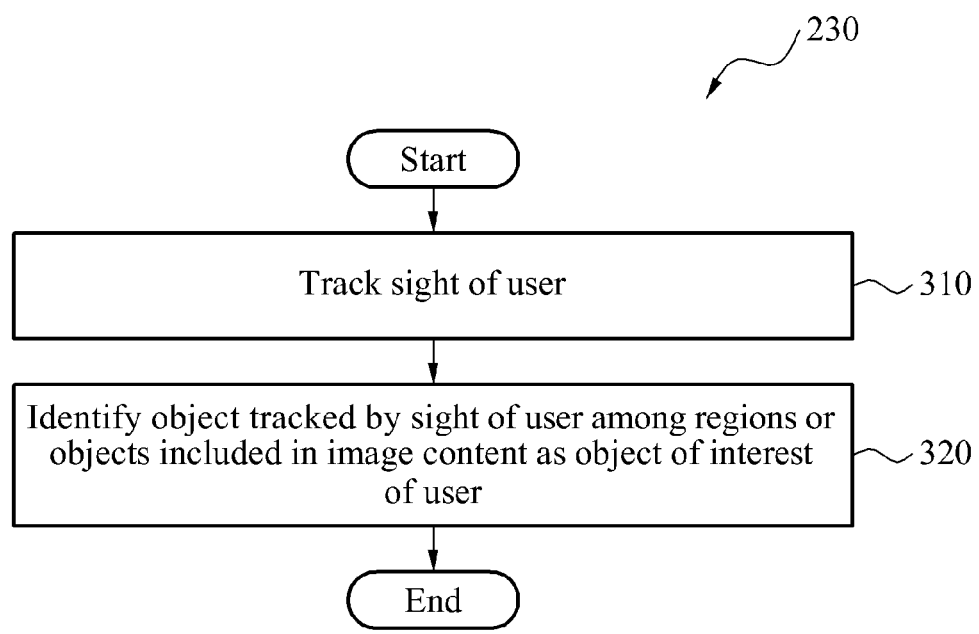
FIG. 3 illustrates a method of identifying an object of interest of a user, according to example embodiments.

FIG. 3 illustrates a method of identifying an object of interest of a user, according to example embodiments.

Referring to FIG. 3, the method 230 of identifying the object of interest by a DTV will be described.

The DTV may track a sight, or a gaze, of the user using a photographing device in operation 310. Here, the photographing device may track the sight of the user, that is, a movement of a black part of a pupil of the user. For example, as shown in 605 of FIG. 6 that will be described later, the photographing device may be disposed at an upper end of the DTV or another position. The photographing device may be single or plural.

The DTV may identify an object tracked by the sight of the user among the plurality of regions or objects included in the image content, as the object of interest of the user, in operation 320.

Figure 6:
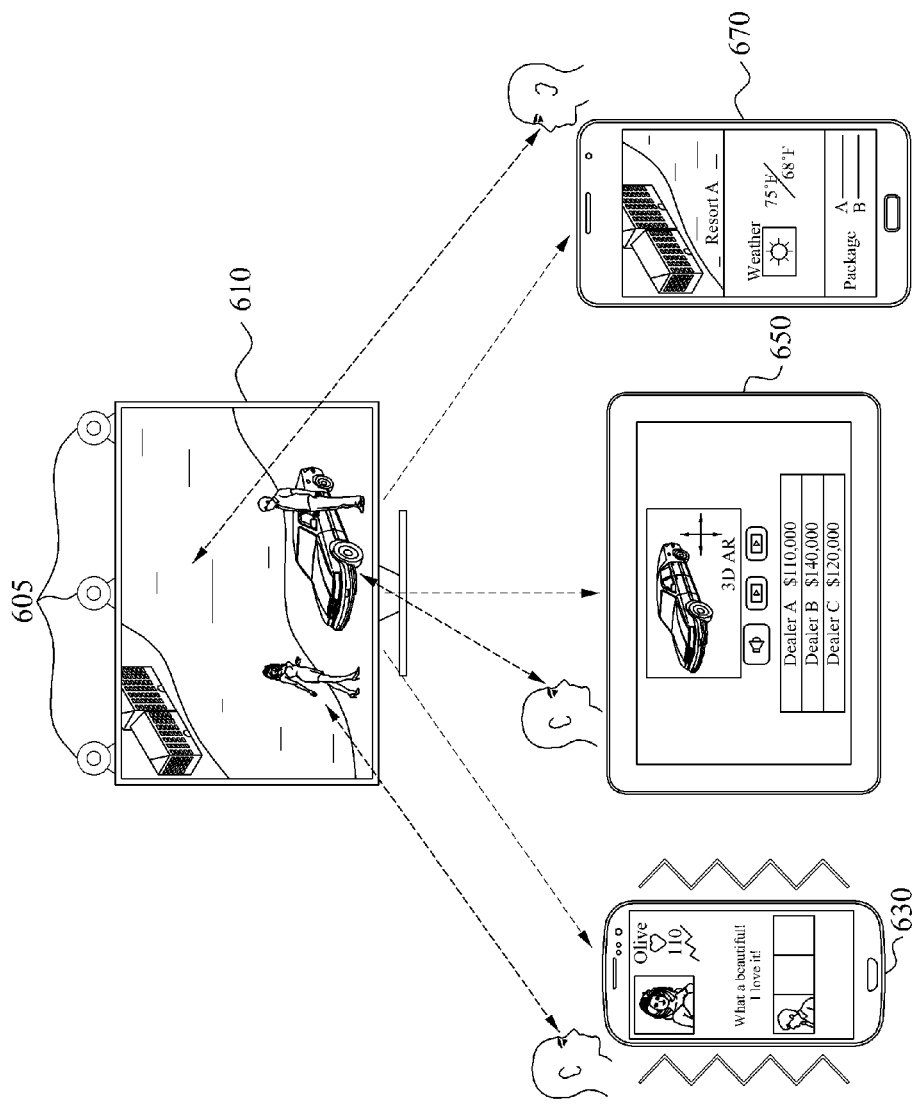
FIG. 6 illustrates examples of various user specific interactions provided between a DTV and user devices, according to example embodiments.

For example, when the sight of the user, among the plurality of regions or objects included in the image content displayed on a screen of FIG. 6, moves along a movement of a heroin, the DTV may identify the heroine as the object of interest. When the sight of the user stays at a car included in the image content of FIG. 6, the DTV may identify the car as the object of interest.

Thus, the object of interest may include anything of the regions or objects included in the image content, such as a person, an object, and a background, for example.

Figure 4:
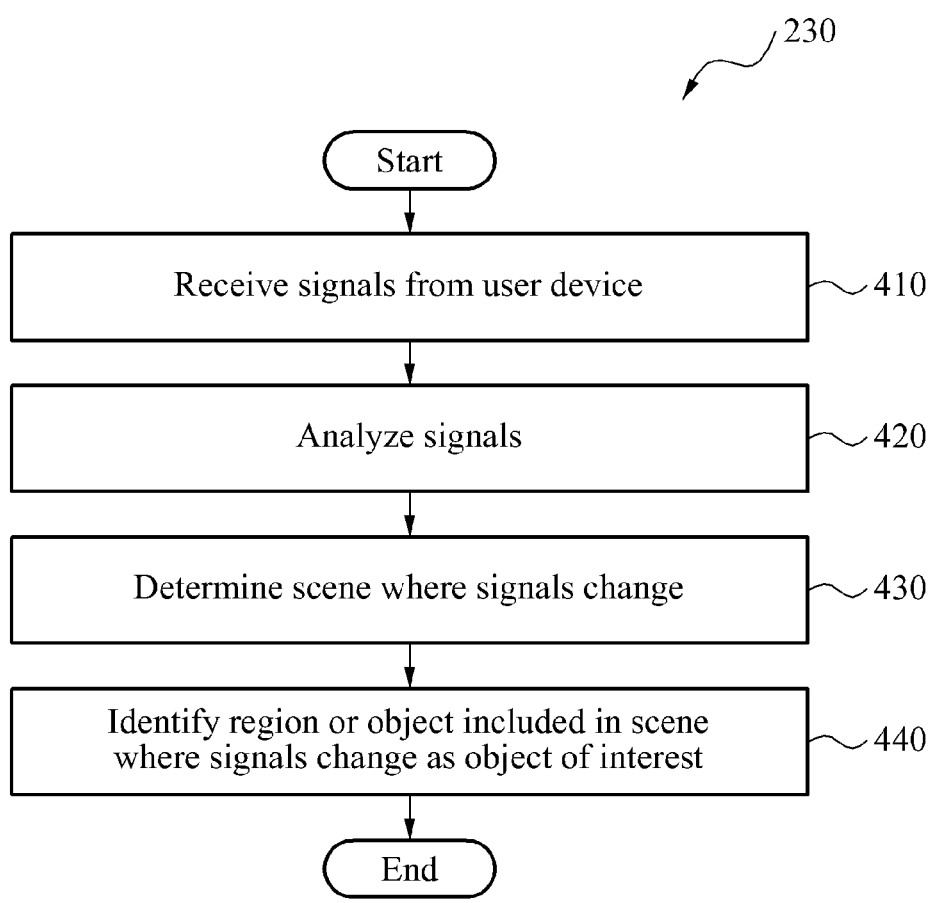
FIG. 4 illustrates a method of identifying an object of interest of a user, according to example embodiments.

FIG. 4 illustrates a method of identifying an object of interest of a user, according to example embodiments.

Referring to FIG. 4, a DTV according to the example embodiments identifies the object of interest using signals received from a user device.

The DTV may receive the signals from the user device for the user, in operation 410. The signals may include at least one of a vital signal of the user detected by the user device and an external force applied to the user device.

Here, the vital signal may include a biorhythm signal, a body temperature, a pulse, brain waves, an eye movement, and the like. The external force applied to the user device may include deformation, a degree of bending, a pressure, a position, rotation of the user device, and a pressure and static electricity or magnetic field detected by a touch display of the user device.

In addition, the signals received from the user device may include a signal related to a motion or gesture of the user, an audio signal, and the like.

In operation 420, the DTV may analyze the signals received from the user device.

In operation 430, the DTV may determine a scene in which a change of signal occurs in the image content as a result of the analysis of operation 420.

In operation 440, the DTV may identify a region or object included in the scene in which the change of signal occurs, as the object of interest.

Figure 5:
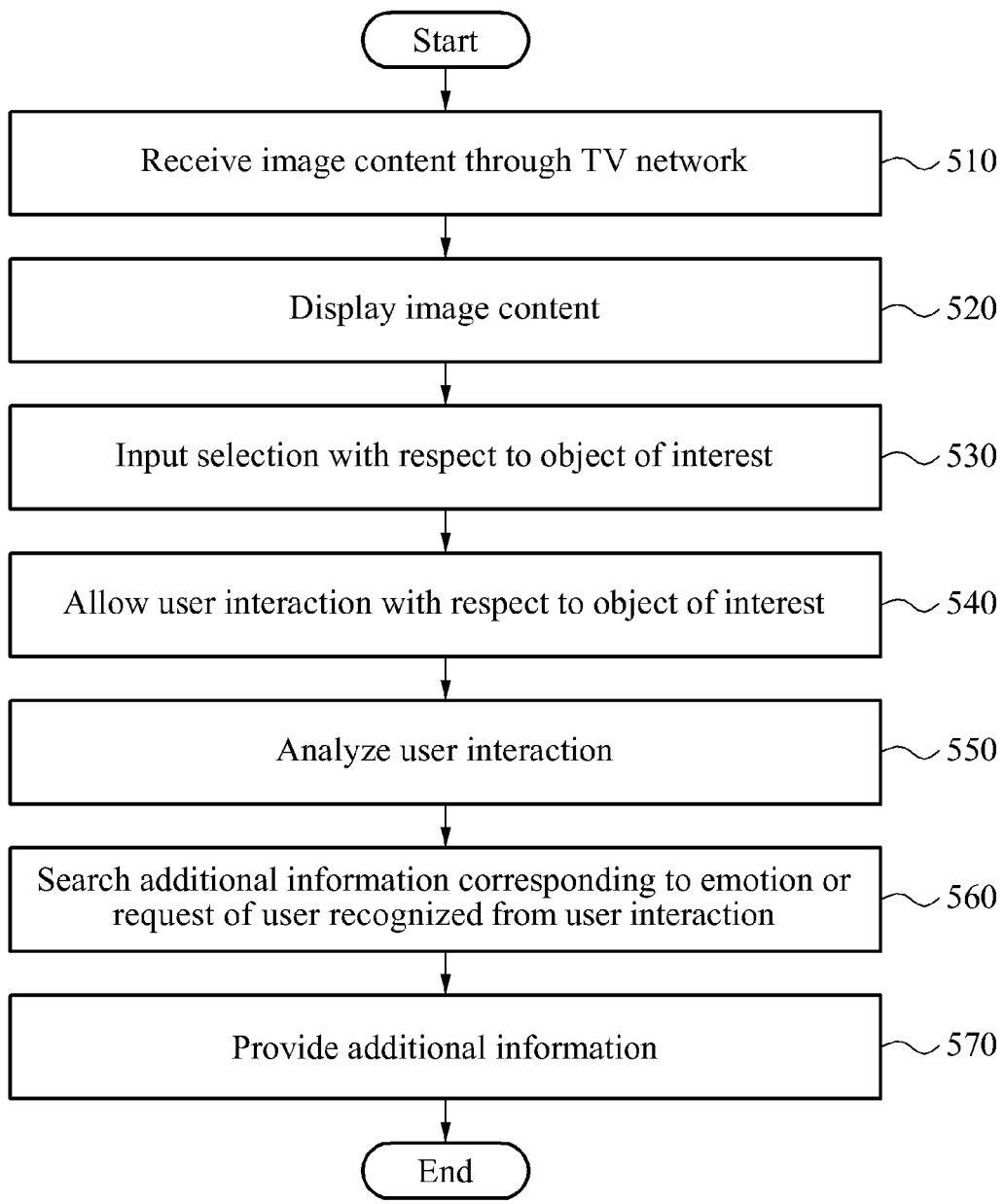
FIG. 5 illustrates a method of providing user specific interaction by a DTV, according to example embodiments.

FIG. 5 illustrates a method of providing user specific interaction by a DTV, according to example embodiments.

Referring to FIG. 5, the DTV according to example embodiments analyze user interaction with respect to the object of interest directly selected by the user, accordingly providing additional information.

The DTV may receive an image content image through a TV network in operation 510, and display the image content in operation 520. As aforementioned, the TV network may include both a broadcasting network and the Internet.

In operation 530, the DTV may be input with a selection with respect to the object of interest among a plurality of regions or a plurality of objects included in the image content.

In operation 540, the DTV may allow an interaction by the user with respect to the object of interest selected in operation 530. Here, the interaction of the user may include a vital signal of the user detected by a user device and an external force applied to the user device.

In response to the interaction of operation 540, the DTV may provide the user device with the additional information corresponding to the object of interest.

In operation 550, the DTV may analyze the interaction of the user with respect to the object of interest.

In operation 560, based on a result of the analysis of operation 550, the DTV may search for additional information corresponding to emotion or request of the user that is recognized from the interaction of the user.

In operation 570, the DTV may provide the user device with the additional information found in operation 560 as additional information corresponding to the object of interest.

As aforementioned, the additional information corresponding to the object of interest may include information providing sensory stimulus corresponding to the object of interest, multinational language subtitles related to the image content that includes the object of interest, translation of a finger language, a Braille type, oscillation, audio supply, audio conversion, user specific sound, information for enlargement of subtitle font, and the like.

FIG. 6 illustrates examples of various user specific interactions provided between a DTV 610 and user devices 630, 650, and 670, according to example embodiments.

Referring to FIG. 6, when a plurality of user devices 630, 650, and 670 appreciate the same image content, various user specific interactions may be provided to the user devices 630, 650, and 670 by interaction between the DTV 610 and the user devices 630, 650, and 670.

The DTV 610 or the user devices 630, 650, and 670 may recognize a character who the user likes, by analyzing vital signals detected as the user directly selects the character from a scene of the image content or as the user contacts his or her body part, such as a hand or face, for example, with the user devices 630, 650, and 670.

The user devices 630, 650, and 670 may identify the object of interest by analyzing a force applied to the user devices 630, 650, and 670. The user devices 630, 650, and 670 may analyze information on the object of interest, thereby providing the additional information corresponding to the object of interest. In addition, the user devices 630, 650, and 670 may provide the information to the DTV 610 so that the DTV 610 may provide the user devices 630, 650, and 670 with the additional information corresponding to the object of interest according to a result of the analysis.

The DTV 610 may track a sight of the user using cameras 605 attached to the DTV 610, thereby identifying the object of interest, such as a character, or an object, for example, corresponding to the sight of the user. Although FIG. 6 illustrates three cameras 605, the disclosure is not limited thereto. For example, one or two cameras may be used, or more than three cameras may be used.

After the object of interest of the user is identified, the user may be provided with emotions of the character the user likes in the image content through additional information through the user devices 630, 650, and 670. Here, the additional information may be provided as the user specific interaction in the form of haptic feedback, display, sound, oscillation, or wind, for example.

For example, it may be presumed that a drama, as the image content, displayed on the DTV 610 includes a scene in which a hero appears in a nice car in front of a heroine.

When the user of the user device 630 likes the heroine and watches a movement of the heroine, the cameras 605 mounted to the DTV 610 may track the sight of the user of the user device 630 and identify the heroine as the object of interest.

When the heroin and the hero like each other in the drama, the user of the user device 630 may be provided with the emotion of the heroine, such as a flutter, with respect to the hero through the user device 630.

Here, the flutter of the heroine with respect to the hero may be expressed by additional information corresponding to the heroine, who is the object of interest. For example, the flutter of the heroine may be expressed by small and large heart shapes displayed on the screen of the user device 630, or small and large oscillations of the user device 630.

When the user of the user device 650 is interested in the car of the hero and continues staring at the car, the cameras 605 may track the sight of the user of the user device 650, thereby identifying the car as the object of interest. Here, it is presumed that the DTV 610 provides the user device 650 with sales information or commercial information related to the car as the additional information corresponding to the car, that is, the object of interest.

Therefore, sales prices according to models of the car and other information may be provided on the screen of the user device 650.

In this case, when color change, headlight control, engine sound, and the like are provided as the additional information corresponding to the car, that is, the object of interest, the user may operate the car or change color of the car using the screen or buttons of the user device 650.

The user of the user device 670 may be interested in a background appearing in the image content.

Besides the above examples, when a hero or heroine the user likes appears in the drama, the user may give a stimulus to the user device, for example, apply a pressure by grasping the user device hard, draw a heart shape on the screen of the user device, wipe the user device, or pet the user device. Therefore, the user device may extract and show only scenes given the stimulus. The user device may find and show other content in which the hero shown in the scenes appears.

In addition, when a spectacular landscape is shown in the image content, the user devices 630, 650, and 670 may analyze the vital signal of the user or analyze a force applied by the user, for example, a pressure level and a shape of drawing. In addition, the user devices 630, 650, and 670 may make the user feel as if the user became the hero or heroine and were in the landscape in the scene given the corresponding stimulus, using a result of the analysis. Here, the corresponding stimulus may include a change in the vital signal, or a change in the force applied to the user device, for example.

For example, when the image content shows a scene showing a cool valley, the user devices 630, 650, and 670 may provide the user with a cool feeling as if the user has soaked her hands in the valley water, ripples of the valley water around the hands of the user, water sound along a movement of the hand, and the like.

The cool feeling may be provided by dropping a temperature of the user device. The ripples may be provided through haptic feedback by oscillating the user device periodically. The water sound may be provided through a sound effect, that is, auditory feedback.

When the image content shows a scene of walking in an autumn scenery with fallen yellow maple leaves, the user may be provided with the sound of stepping on the fallen leaves through auditory feedback, a feel of touching the fallen leaves through haptic feedback, a change of the fallen leaves being moved by a hand through visual feedback and auditory feedback.

Thus, the user devices 630, 650, and 670 may convert contents marked in a script included in the image content such as a movie and a drama into the information stimulating the senses, for example, haptic, oscillation, and the like, thereby giving feedback to the user.

Furthermore, the user devices 630, 650, and 670 may transmit a corresponding interaction to the user to provide senses, such as visual, haptic, taste, olfactory, and auditory senses of when he or she directly operates an object appearing in a commercial, a movie, and a drama.

For example, the user may be fed back with the sensory stimulus for the visual, haptic, taste, olfactory, and auditory senses as if the he or she were experiencing a person, object, animal, or landscape interested by the user in the commercial, movie, and drama.

An example of providing feedback related to various senses including the visual, auditory, haptic, and the like by the user devices 630, 650, and 670 will be described as follows.

When a car is shown in the image content, the user devices 630, 650, and 670 may display a 3-dimensional (3D) model of the car on the screen and may generate interaction as the user pushes a button, thereby providing the user with an experience of directly manipulating and driving the car. Here, the interaction may include operations of sounding a horn when the user pushes a button corresponding to Klaxon in the user device, turning on a light when the user pushes a button corresponding to a headlight, generating trembles of when starting the car, and the like. For example, audio, 3D model rendering, and augmented reality (AR) technologies may be used to generate such operations.

Depending on embodiments, the DTV may exchange signals with a massage chair or a robot cleaner being at home and then the massage chair or the robot cleaner may function as a driver seat of the car. That is, when the user sits on the massage chair or the robot cleaner, the user may be provided with a feel of riding a car.

Various other types of feedback will be described in detail.

As to the visual feedback, when the user likes clothes a character in the image content wears, the user device may display the user wearing the clothes of the character. Also, the user wearing the clothes and moving may be shown on the DTV. Here, the AR technology may be used.

As to the haptic feedback, when the image content shows an electric fan or air-conditioner commercial, the user device may blow air and deliver a cool feeling to the user. When the image content shows a cold drink, the user may be provided a cold feeling by dropping the temperature of the user device.

As to the olfactory feedback, when the image content shows a piney mountain scene, the user device may deliver a natural smell of pine needles or pine resin that the user remembers to the user. In detail, the user device may directly generate the natural smell or may search for the natural smell the user remembers from a memory of the user and transmit a stimulus to the user's brain, so that the user feels as if he or she were smelling the natural smell in person. In addition, when the image content displays coffee, the user device may deliver a coffee smell to the user in the same manner.

As to the taste feedback, when the image content shows chocolate, the user device may deliver sweetness to the user as if the user were eating chocolate. In this case, the user device may search for an experience of the user of eating chocolate from brain waves or the memory, and transmit a corresponding signal to the user's brain, so that the user may feel an experience of eating chocolate.

Random olfactory and taste feedback may provide the user with a stimulus corresponding to an experience of an olfactory stimulus or a taste stimulus of the past.

When a person receives a sensory stimulus, particular cells of a hippocampus of a brain are activated and store the stimulus in a cerebral cortex. Therefore, the person may recall the stimulus when given the same stimulus. Accordingly, the example embodiments may provide types of feedback that stimulate the senses using the experience about the stimulus.

For example, when the person smells coffee by his or her nose, the particular cells of the hippocampus may be activated and store a corresponding stimulus in the cerebral cortex. Reversely, when the cerebral cortex is given a stimulus same as when the user smells coffee, the user may receive the olfactory feedback, that is, a feeling as if the user actually smelt coffee.

When the user eats sweet chocolate, the particular cells of the hippocampus may be activated and store a corresponding stimulus in the cerebral cortex. Reversely, when the cerebral cortex is given a taste stimulus the same as when the user eats chocolate, the user may receive the olfactory feedback, that is, a feeling as if the user actually ate chocolate.

Here, activation of the particular cells in the hippocampus may be recognized by a camera, a rheometer, and the like and a stimulus corresponding to signals detected by those devices may be analyzed and determined. Next, the user device may find corresponding stimulus information and give a feedback to the user and may visually show the process through the AR.

Also, depending on embodiments, the user may directly purchase goods interested by the user, among objects showing on the image content or commercials, by applying a predetermined force to the user device.

Figure 7:
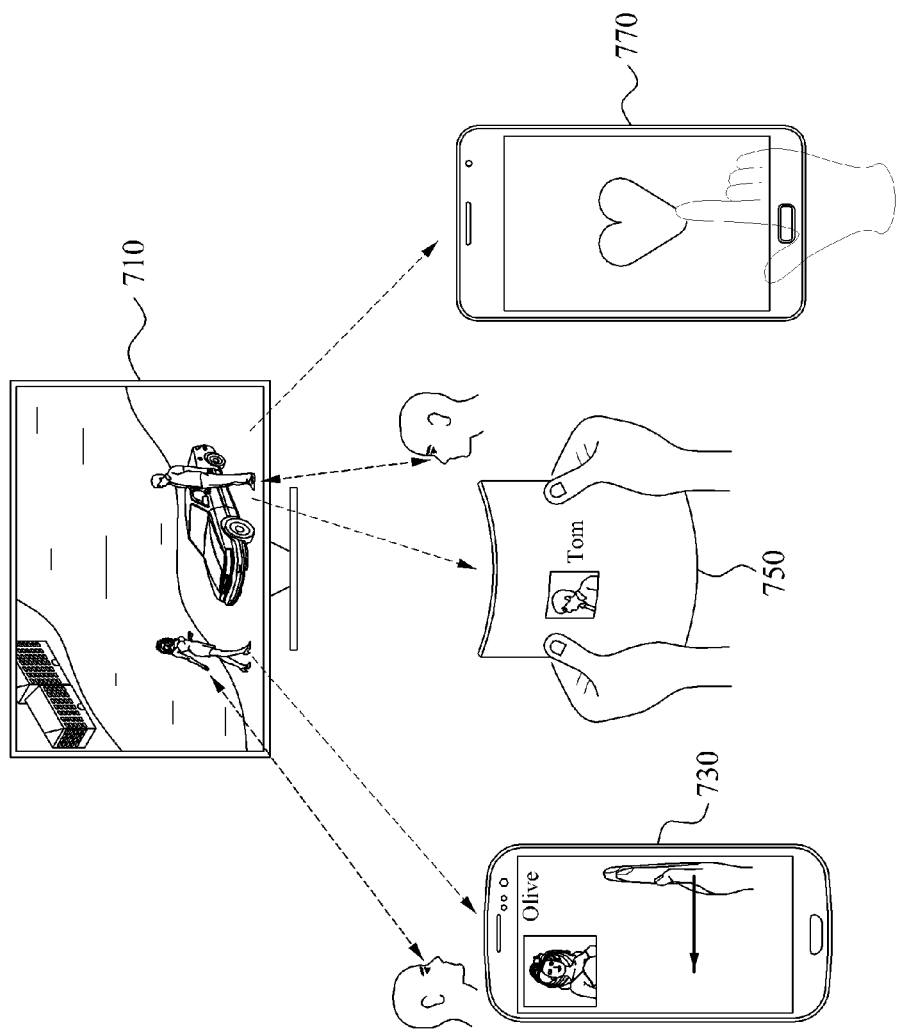
FIG. 7 illustrates various examples of interactions of a user allowed with respect to an object of interest of the user, by a method of providing user specific interaction according to example embodiments.

FIG. 7 illustrates various examples of interactions of a user allowed with respect to an object of interest of the user, by a method of providing user specific interaction according to example embodiments.

Referring to FIG. 7, image content 710 is reproduced through a DTV.

Here, a heroine who the user likes, called Olive, is shown in the image content 710, the user may stand his or her hand on a side and scans the screen of the user device as shown in 730. In this case, through a specific motion of the user, which is the screen scanning in this example, the user device may store a scene including Olive currently showing on the screen.

When a hero the user likes, called Tom, is showing in the image content 710, the user may store a scene including Tom by bending a flexible display functioning as the user device as shown in 750.

Furthermore, the user may become the hero, Tom, and store only scenes in which Tom feels love with Olive. In this case, the user may store the scenes corresponding to a heart shape representing the love emotion. Therefore, the user may retrieve the scenes by drawing the heart shape on the screen of the user device as shown in 770.

Moreover, the user may give other stimuli to the user device, for example, by grasping the user device hard to apply a pressure, wiping the screen of the user device, and petting the user device. Through this, the user device may extract and show only scenes given the stimulus. The user device may find and show other contents in which the hero shown in the scenes appears.

Figure 8:
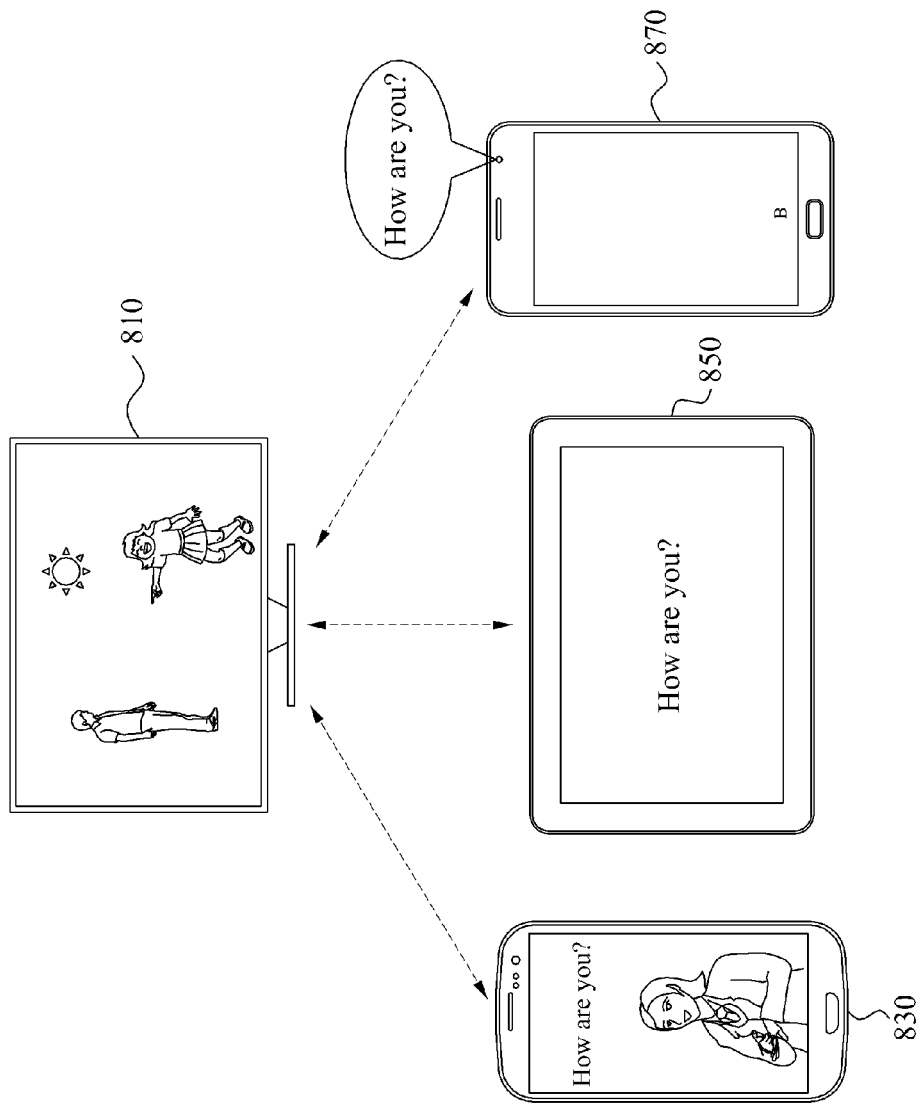
FIG. 8 illustrates various examples of additional information corresponding to an object of interest which is provided to a user device by a method of providing user specific interaction according to example embodiments.

FIG. 8 illustrates various examples of additional information corresponding to an object of interest which is provided to a user device by a method of providing user specific interaction according to example embodiments.

Referring to FIG. 8, a movie 810 is reproduced through a screen of a DTV watched by a plurality of users including a first user, a second user, a third user, and a fourth user. Here, when a scene of the movie 810 is the object of interest of the users, different additional information 830, 850, and 870 corresponding to the object of interest may be provided to user devices of the respective users.

Here, the user device of the first user may be provided with a finger language translation service as additional information for hearing-impaired people corresponding to the scene of the movie 810 as shown in 830.

The user device of the second user may be provided with an English subtitle as additional information for a foreign language translation display as shown in 850.

The user device of the third user may be provided with an audio service, a Braille type, oscillation, and the like as additional information for the visually handicapped as shown in 870.

In addition, corresponding to the scene of the movie 810, a language translation service may be provided as the additional information. For example, the first user may be provided with a Korean subtitle, the second user may be provided with an English subtitle, and the third user may be provided with a French subtitle.

Besides, according to the example embodiments, an age-based service may be provided. For example, children may be provided with a dubbing service that provides audio of a translated language. Elderly people may be provided with additional information that increases sound volume or font size.

A customized audio service may be provided through an earphone or by different sounds according to positions of each user by applying a sound focusing technology that uses ultrasonic waves.

In this case, contents marked in a script included in the content such as a movie and a drama may be translated by an operator or converted into audio, thereby giving feedback to the user.

Thus, various types of information corresponding to the object of interest may be provided to the user device according to the example embodiments.

Figure 9:
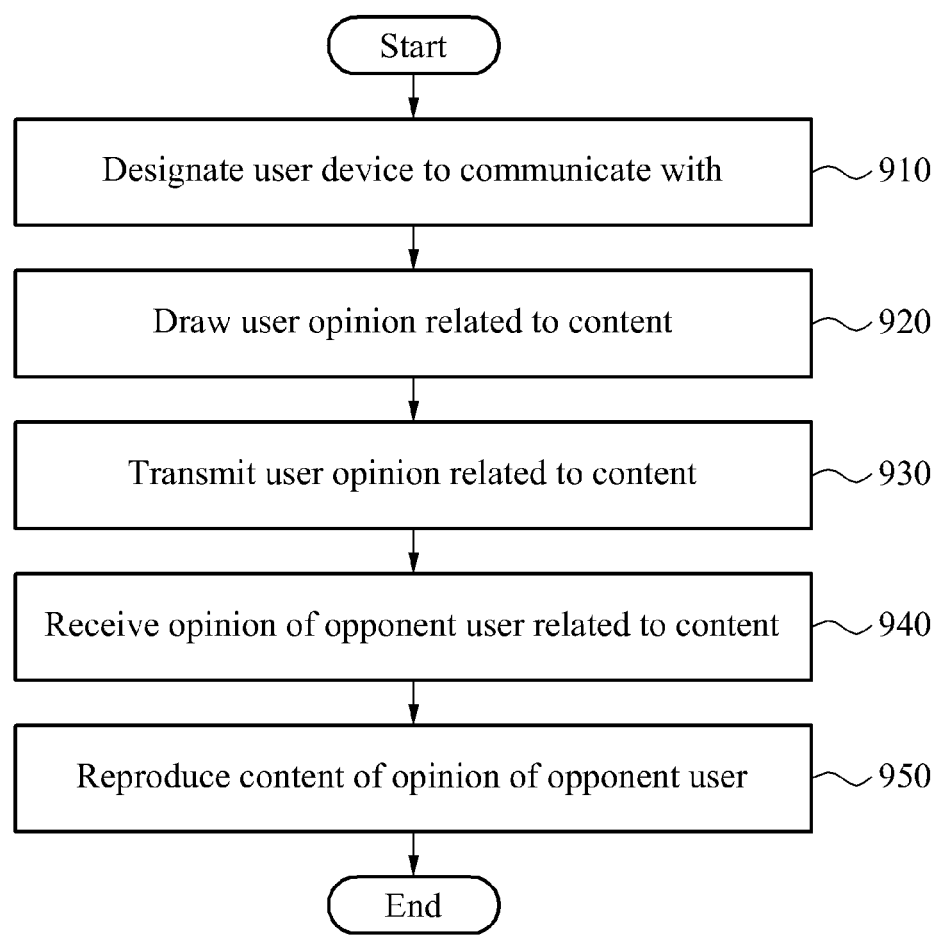
FIG. 9 illustrates a method of giving opinions between user devices with respect to image content provided by a method of providing user specific interaction according to example embodiments.

FIG. 9 illustrates a method of giving opinions between user devices with respect to image content provided by a method of providing user specific interaction according to example embodiments.

Referring to FIG. 9, the user device may generate a space, for example a cyber space or a chatting room, for enabling users who are watching the same channel or content communicate about objects including persons or objects included in the content.

In operation 910, a user may designate an opponent user device to communicate through a chatting room with the users watching the same channel or content. In addition, the user may draw a user opinion with respect to the content using an application such as a short message service (SMS) in operation 920, and transmit the user opinion to the opponent user in operation 930.

Here, for example, the user opinion may usually relate to a character or clothes of the character.

The user may receive the user opinion of the opponent user in operation 940, and reproduce content of the user opinion of the opponent user in operation 950.

Thus, according to the example embodiments, users watching the same content may produce a chatting room and communicate about objects such as a character, accessories of the character, places, buildings, and the like, shown in the content such as a movie. In addition, users watching the same channel or content may produce a chatting room and communicate about a character or clothes of the character using an application such as the SMS.

Figure 10:
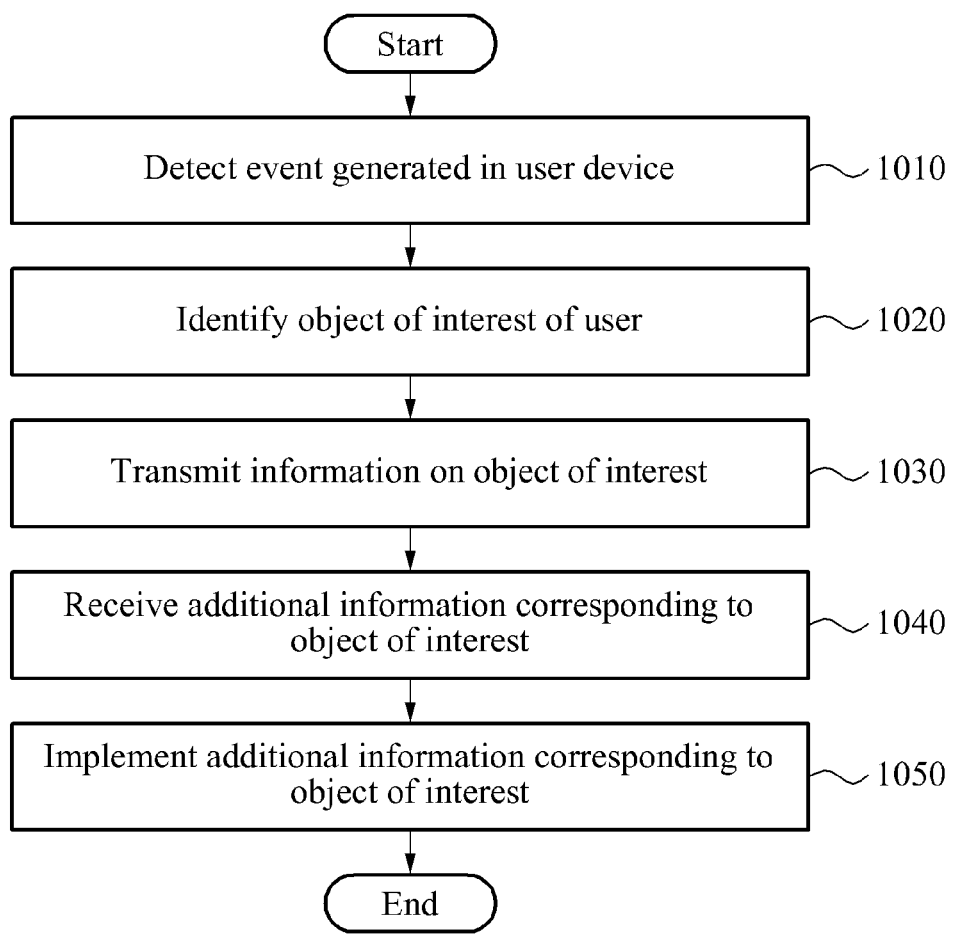
FIG. 10 illustrates a method of providing user specific interaction by a user device, according to example embodiments.

FIG. 10 illustrates a method of providing user specific interaction by a user device, according to example embodiments.

Referring to FIG. 10, in operation 1010, the user device may detect an event generated in the user device in response to image content being displayed on a DTV.

The event may include at least one of a change in a vital signal of the user detected by the user device and a change in an external force applied to the user device. For example, the user device may detect the change in the vital signal through a device measuring a vital signal, such as a heart rate monitor (HRM) installed inside or outside the user device.

The change in the external force applied to the user device may include deformation such as bending or curving applied to a flexible display, a pressure change caused by a touch of the user applied to a screen of a touch display of the user device, and a change of a magnetic field or static electricity.

Depending on embodiments, the user device may transmit signals including the event generated in the user device to the DTV.

Based on the event detected in operation 1010, the user device may identify the object of interest of the user among a plurality of regions or a plurality of objects included in the image content in operation 1020. In operation 1020, the user device may identify a region or object included in the image content of a time point when the event is detected, among the plurality of regions or objects, as the object of interest.

In operation 1030, the user device may transmit information on the object of interest identified in operation 1020 to the DTV so as to be provided with the additional information corresponding to the object of interest.

In response to the transmission of the information on the object of interest, the user device may receive the additional information corresponding to the object of interest from the DTV in operation 1040.

In operation 1050, the user device may realize the additional information corresponding to the object of interest.

Here, the additional information may include at least one of information providing sensory stimulus corresponding to the object of interest, multinational language subtitles related to the image content that includes the object of interest, translation of a finger language, a Braille type, oscillation, audio supply, audio conversion, user specific sound, information for enlargement of subtitle font, and the like.

The information providing sensory stimulus corresponding to the object of interest may include at least one of haptic information stimulating a haptic sense, sound information stimulating an auditory sense corresponding to the object of interest, display information stimulating a visual sense corresponding to the object of interest, smell information stimulating an olfactory sense corresponding to the object of interest, and taste information stimulating a taste sense corresponding to the object of interest.

Figure 11:
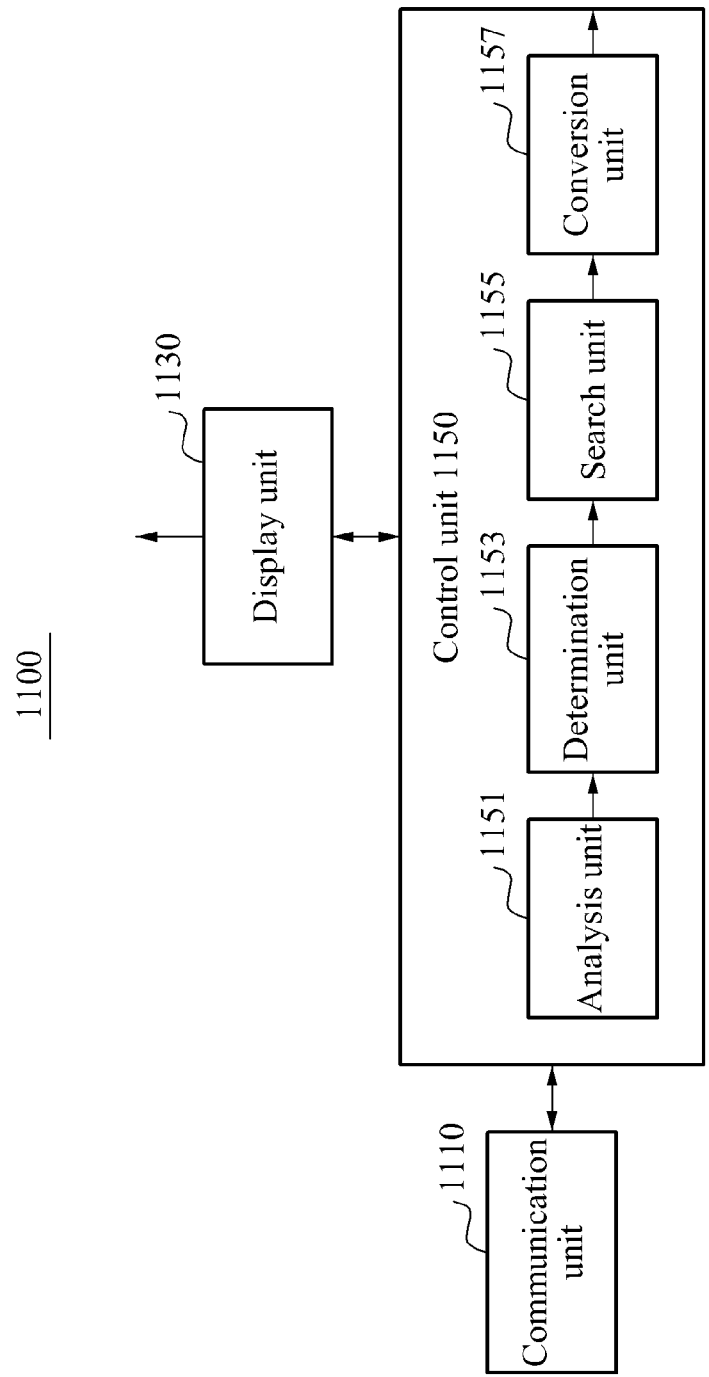
FIG. 11 illustrates a DTV providing user specific interaction, according to example embodiments.

FIG. 11 illustrates a DTV 1100 providing user specific interaction, according to example embodiments.

Referring to FIG. 11, the DTV 1100 may include a communication unit 1110, a display unit 1130, and a control unit 1150.

The communication unit 1110 may receive image content through a TV network.

The TV network may be understood to include both a broadcasting network and the Internet.

The display unit 1130 may display the image content received by the communication unit 1110.

The control unit 1150 may identify an object of interest of a user among a plurality of regions or a plurality of objects included in the image content, and provide additional information corresponding to the object of interest.

The control unit 1150 may include an analysis unit 1151, a determination unit 1153, a search unit 1155, and a conversion unit 1157.

The analysis unit 1151 may analyze signals received from a user device. Here, the signals received from the user device may include a force applied to the user device, a vital signal of the user, preference information of the user, and the like.

The determination unit 1153 may determine a scene in which signals are changed among the plurality of regions or the plurality of objects included in the image content, as a result of analysis of the analysis unit 1151.

For example, the determination unit 1153 may determine a content scene in which the force applied to the user device is changed or a content scene in which an emotion or request of the user is changed.

Here, the control unit 1150 may identify the region or object included in the scene in which the signals are changed, as the object of interest.

The search unit 1155 may search for the additional information corresponding to the object of interest.

The search unit 1155 may search for an effect corresponding to the content scene determined as the object of interest, or information on emotion or request, that is, the preference information, of the user.

The control unit 1150 may provide the user device with the additional information found by the search unit 1155 as the additional information corresponding to the object of interest.

The conversion unit 1157 may convert the additional information corresponding to the object of interest, found by the search unit 1155, according to the emotion or request of the user.

Figure 12:
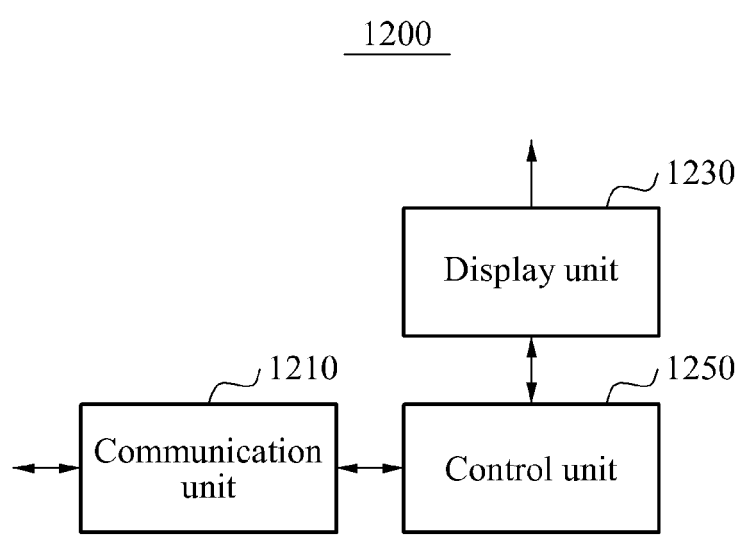
FIG. 12 illustrates a DTV providing user specific interaction, according to example embodiments.

FIG. 12 illustrates a DTV 1200 providing user specific interaction, according to example embodiments.

Referring to FIG. 12, the DTV 1200 may include a communication unit 1210, a display unit 1230, and a control unit 1250.

The communication unit 1210 may receive image content through a TV network.

The display unit 1230 may display the image content.

The control unit 1250 may be input with selection with respect to the object of interest among a plurality of regions or a plurality of objects included in the image content. In addition, the control unit 1250 may provide the additional information corresponding to the object of interest in response to user interaction with respect to the selected object of interest.

Figure 13:
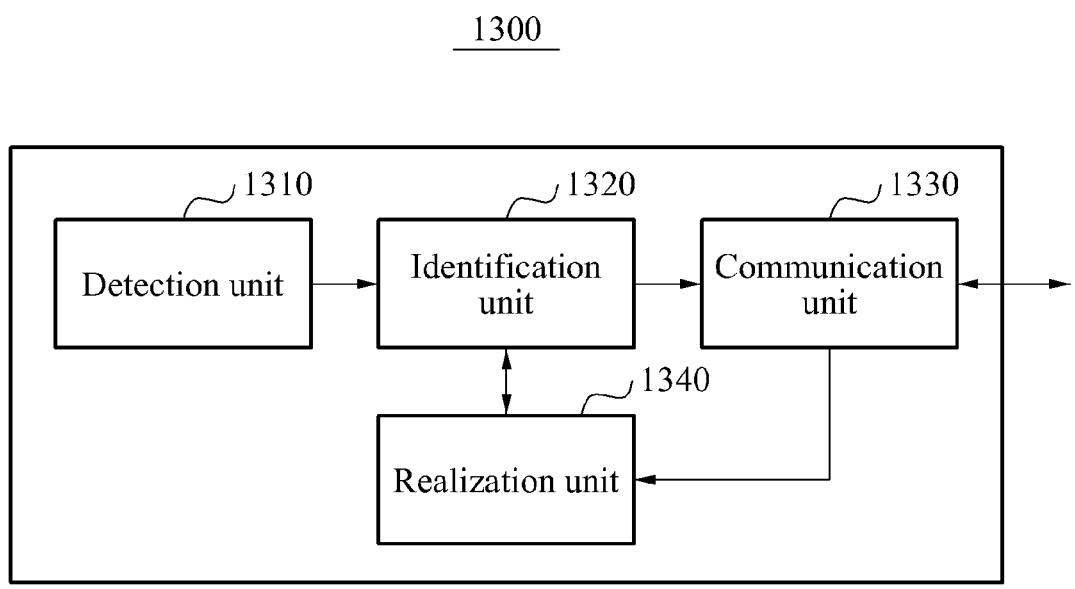
FIG. 13 illustrates a user device providing user specific interaction, according to example embodiments.

FIG. 13 illustrates a user device 1300 providing user specific interaction, according to example embodiments.

Referring to FIG. 13, the user device 1300 may include a detection unit 1310, an identification unit 1320, a communication unit 1330, and a realization unit 1340.

The detection unit 1310 may detect an event generated in the user device in response to image content displayed through a DTV.

Here, the event may include a change in a vital signal of a user detected by the user device 1300 and a change in an external force applied to the user device. For example, the user device may detect the change in the vital signal through a device measuring a vital signal, such as an HRM installed inside or outside the user device.

The change in the external force applied to the user device may include deformation such as bending or curving applied to a flexible display, a pressure change caused by a touch of the user applied to a screen of a touch display of the user device, and a change of a magnetic field or static electricity.

The identification unit 1320 may identify an object of interest of the user among a plurality of regions or a plurality of objects included in the image content base on the event detected by the detection unit 1310.

The communication unit 1330 may transmit information on the object of interest or signals including the event to the DTV so as to be provided with additional information corresponding to the object of interest.

The realization unit 1340 may realize the additional information corresponding to the object of interest. The additional information may be received from the DTV displaying the image content.

FIG. 14 illustrates a system including a DTV 1450 and a plurality of user devices which provide user specific interaction, according to example embodiments.

Referring to FIG. 14, the system providing user specific interaction may include a first user device 1410, a second user device 1420, an N-th user device 1430, and the DTV 1450.

Each of the user devices may include a detection unit, a communication unit, and an identification unit which are described in detail with reference to FIG. 13.

The DTV 1450 may include a communication unit 1451, a display unit 1453, an analysis unit 1455, a determination unit 1456, a search unit 1457, and a conversion unit 1458. The analysis unit 1455, the determination unit 1456, the search unit 1457, and the conversion unit 1458 may be referred to as a 'control unit.'

The components of the DTV 1450 are described with reference to FIG. 11.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape;

optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A method of providing an interaction in an electronic device, the method comprising:
   sensing a user-generated event;
   identifying an object of interest of the user based on the sensed event;
   acquiring additional information on the object of interest based on information on the identified object of interest; and
   providing the additional information on the object of interest.

2. The method of claim 1, wherein the acquiring comprises:
   transmitting the information on the identified object of interest to an external device; and
   receiving the additional information on the object of interest from the external device,
   wherein the additional information comprises information into which the additional information on the object of interest is converted to be appropriate for the electronic device.

3. The method of claim 1, wherein the acquiring comprises generating the additional information on the object of interest by analyzing the information on the identified object of interest.

4. The method of claim 1, wherein the identifying comprises identifying the object of interest among objects or regions included in an image content displayed on an external device different from the electronic device, based on the sensed event.

5. The method of claim 1, wherein the event comprises at least one of a biosignal of the user sensed through the electronic device and an external force applied to the electronic device.

6. The method of claim 1, wherein the identifying comprises:
   analyzing the generated event; and
   identifying the object of interest of the user based on a result of the analyzing.

7. The method of claim 1, wherein the additional information comprises at least one of information providing sensory stimulus corresponding to the object of interest, multinational language subtitles related to an image content that includes the object of interest, translation of a finger language, a Braille type, oscillation, audio supply, audio conversion, user specific sound, and information for enlargement of a subtitle font.

8. The method of claim 7, wherein the information providing sensory stimulus comprises at least one of haptic information providing a tactile stimulus corresponding to the object of interest, sound information providing an auditory stimulus corresponding to the object of interest, display information providing a visual stimulus corresponding to the object of interest, smell information providing an olfactory stimulus corresponding to the object of interest, and taste information providing a taste stimulus corresponding to the object of interest.

9. The method of claim 1, wherein the identifying comprises:
   allowing an interaction of the user through the electronic device; and
   identifying, as the object of interest, an object or a region corresponding to the interaction among objects or regions included in an external area of the electronic device.

10. The method of claim 1, wherein the electronic device comprises at least one of a wearable glass and a screen.

11. The method of claim 1, wherein the providing comprises:
    displaying the additional information on the object of interest on a display included in the electronic device; and
    transmitting the additional information to an external display device.

12. A non-transitory computer-readable medium comprising a program for instructing a computer to perform the method of claim 1.

13. A method of providing user-specific interaction, the method comprising:
    displaying an image content on a display device;
    identifying an object of interest of a user among at least one of regions and objects included in the image content; and
    providing additional information corresponding to the object of interest,
    wherein the display device analyzes signals of a user device, converts additional information corresponding to the analyzed signal to be appropriate for the user device, and provides the converted additional information to the user device, wherein the signal received from the user device comprises at least one of a vital signal of the user detected by the user device and an external force applied to the user device.

14. The method of claim 13, further comprising:
    receiving signals from the user device used by the user;
    wherein the identifying comprises identifying the object of interest using the signals received from the user device.

15. The method of claim 13, further comprising:
    searching for additional information corresponding to the object of interest.

16. The method of claim 13, wherein the additional information corresponding to the object of interest comprises at least one of information providing sensory stimulus corresponding to the object of interest, multinational language subtitles related to the image content that includes the object of interest, translation of a finger language, a Braille type, oscillation, audio supply, audio conversion, user specific sound, and information for enlargement of a subtitle font.

17. A method of providing user-specific interaction, the method comprising:
  displaying an image content on a display device;
  identifying an object of interest of a user among at least one of regions and objects included in the image content; and
  providing additional information corresponding to the object of interest,
  wherein the display device analyzes a signal of a sensor, converts additional information corresponding to the analyzed signal to be appropriate for a user device, and provides the converted additional information to the user device.

18. The method of claim 17, wherein the identifying comprises:
  tracking a gaze of the user using the sensor; and
  identifying an object tracked by the gaze of the user as the object of interest of the user.

19. The method of claim 17, wherein the identifying comprises:
  analyzing the signal received from the sensor;
  determining a scene in which the signal is changed in the image content as a result of the analysis; and
  identifying a region or object included in the scene in which the signal is changed as the object of interest.

20. The method of claim 17, wherein the additional information corresponding to the object of interest comprises at least one of information providing sensory stimulus corresponding to the object of interest, multinational language subtitles related to the image content that includes the object of interest, translation of a finger language, a Braille type, oscillation, audio supply, audio conversion, user specific sound, and information for enlargement of a subtitle font.

21. The method of claim 1, wherein the electronic device includes a smart phone, a mobile personal computer (PC), wearable glasses, and a flexible display.

* * * * *